United States Patent
Lomax, Jr. et al.

(10) Patent No.: US 8,308,439 B2
(45) Date of Patent: Nov. 13, 2012

(54) METHOD AND APPARATUS FOR RESISTING DISABLING FOULING OF COMPRESSORS IN MULTISTAGE COMPRESSION SYSTEMS

(75) Inventors: Franklin D. Lomax, Jr., Falls Church, VA (US); Christopher P. Heinrichs, McLean, VA (US); James E. Shaffer, Huntington, MD (US)

(73) Assignee: Lummus Technology Inc., Bloomfield, NJ (US)

( * ) Notice: Subject to any disclaimer, the term of this patent is extended or adjusted under 35 U.S.C. 154(b) by 241 days.

(21) Appl. No.: 11/780,945

(22) Filed: Jul. 20, 2007

(65) Prior Publication Data

US 2009/0022602 A1 Jan. 22, 2009

(51) Int. Cl.
*F04B 25/00* (2006.01)
*F04B 3/00* (2006.01)
*F04B 5/00* (2006.01)

(52) U.S. Cl. ............ 417/19; 417/253; 417/266; 417/53; 417/32; 417/243

(58) Field of Classification Search ............. 417/53, 417/253, 266, 19, 32, 243
See application file for complete search history.

(56) References Cited

U.S. PATENT DOCUMENTS

| | | | | |
|---|---|---|---|---|
| 3,369,361 A | * | 2/1968 | Craig | 60/39.5 |
| 4,275,570 A | | 6/1981 | Szymaszek et al. | |
| 4,409,005 A | | 10/1983 | McKendrick | |
| 4,413,946 A | * | 11/1983 | Marshall et al. | 415/28 |
| 4,479,025 A | * | 10/1984 | Imai | 585/441 |
| 4,605,357 A | | 8/1986 | Keith | |
| 4,752,374 A | * | 6/1988 | Reid | 208/48 AA |
| 4,889,471 A | | 12/1989 | Izunaga et al. | |
| 5,054,294 A | * | 10/1991 | Dudley | 62/228.4 |
| 5,195,874 A | | 3/1993 | Odagiri | |
| 5,224,836 A | * | 7/1993 | Gunn et al. | 417/14 |
| 5,414,168 A | * | 5/1995 | Scott | 585/2 |
| 5,672,793 A | * | 9/1997 | Bares et al. | 585/5 |

(Continued)

FOREIGN PATENT DOCUMENTS

EP 1 475 586 A2 11/2004

OTHER PUBLICATIONS

U.S. Appl. No. 12/939,840, filed Nov. 4, 2010, Lomax, et al.

*Primary Examiner* — Charles Freay
*Assistant Examiner* — Christopher Bobish
(74) *Attorney, Agent, or Firm* — Alix, Yale & Ristas, LLP (57) ABSTRACT

A method of operating a multistage gas compressor system including providing a plurality of compressor stages connected in series, receiving a gas flow having contaminants within a gas passage, and supplying solvent to the gas passage at or upstream of a compressor in a compressor stage of the plurality of compressor stages to entrap or dissolve the contaminants in the gas flow. The method includes resisting disabling fouling of the compressor in the compressor stage from any contaminants entrapped or dissolved in the solvent, for example, by controlling a discharge temperature of the compressor, and/or using a type of compressor that is not susceptible to being disabled by fouling in at least the first stage. The discharge temperature can be controlled by providing the compressor with a pressure ratio selected to provide a desired discharge temperature.

24 Claims, 3 Drawing Sheets

U.S. PATENT DOCUMENTS

| | | | |
|---|---|---|---|
| 5,836,746 A | 11/1998 | Maruyama et al. | |
| 6,142,741 A * | 11/2000 | Nishihata et al. | 417/32 |
| 6,165,368 A * | 12/2000 | Zamarripa | 210/698 |
| 6,401,457 B1 * | 6/2002 | Wang et al. | 60/599 |
| 6,651,433 B1 * | 11/2003 | George, Jr. | 60/618 |
| 6,911,065 B2 | 6/2005 | Watanabe et al. | |
| 6,948,919 B2 * | 9/2005 | Roslund et al. | 417/423.7 |
| 2003/0206808 A1 * | 11/2003 | Walker | 417/53 |
| 2003/0223885 A1 * | 12/2003 | Nakamura et al. | 417/228 |
| 2006/0266074 A1 | 11/2006 | Groll et al. | |
| 2007/0157595 A1 * | 7/2007 | Lockwood, Jr. | 60/39.17 |

* cited by examiner

METHOD AND APPARATUS FOR RESISTING DISABLING FOULING OF COMPRESSORS IN MULTISTAGE COMPRESSION SYSTEMS

BACKGROUND OF THE INVENTION

1. Field of the Invention

The present invention relates to processing and recycling of spent protective atmosphere gas contaminated with fouling organic decomposition byproduct materials during thermal processing.

2. Discussion of the Background

Protective atmosphere gas used in heat treatment or other thermal processing has long been discarded after use in industries where the components being treated are coated or bound with organic species. Examples include batch annealing of metal coated with residual rolling oils and reduction and/or sintering of metal powders or fibers combined with organic binders. The spent atmosphere gases, usually at low pressure, have been considered too prone to formation of fouling deposits to be compressed, let-alone otherwise purified and recycled. This is true even when total impurities are extremely low.

The fouling tendencies usually arise from the formation of poly-cyclic aromatic hydrocarbons (PAH's) during the thermal processing step. Most compounds of this type form solid deposits at standard conditions. These solids are prone to further thermal dehydrogenation, with an eventual tendency to form a range of adherent solids referred to as "varnish," "tar," or "coke." These fouling tendencies are especially strong when gas mixtures containing these compounds are compressed, for two reasons. First, increasing the total pressure of the mixture increases the thermodynamic tendency towards solid formation during interstage cooling, as the partial pressure of the contaminants is increased. And second, the high temperatures experienced in many compression cycles can accelerate the formation of thermal decomposition products such as varnish, tar and coke. If these are formed in critical moving parts, such as compressor valves, then malfunction will be greatly accelerated.

In an effort to eliminate the above problems, a method and apparatus for the recycling of spent atmosphere gases was devised that advantageously reduces the net consumption of atmosphere gas, such as in U.S. application Ser. No. 11/749,521. Thus, a method and apparatus was provided to facilitate the processing of atmosphere gases contaminated with fouling organic decomposition byproduct materials.

However, the inventors of the present invention have discovered that in compression systems for gases containing significant contamination due to heavy hydrocarbons, especially PAH's, that normally-accepted temperature limits within such compression systems can be too high to prevent chemical degradation of the contaminants, even when the contaminates are dissolved in lubricating oil, as in U.S. application Ser. No. 11/749,521.

BRIEF SUMMARY OF THE INVENTION

In an effort to eliminate the above problems, the inventors have devised an improved multistage gas compressor system and method to resist disabling fouling of one or more of the compressor stages therein.

The present invention advantageously provides a system and method of operating a multistage gas compressor system that includes providing a plurality of compressor stages connected in series, receiving a gas flow having contaminants within a gas passage, and supplying solvent to the gas passage at or upstream of a compressor in a compressor stage of the plurality of compressor stages to entrap or dissolve the contaminants in the gas flow. The present invention advantageously resists disabling fouling of the compressor in the compressor stage from any contaminants entrapped or dissolved in the solvent, for example, by controlling a discharge temperature of the compressor, and/or using a type of compressor that is not susceptible to being disabled by fouling in at least the first stage.

The present invention further provides a high compressor temperature prevention algorithm that provides a method of controlling one or more stages of a multi-stage compressor system such that one or more of the compressors within the multi-stage compressor system are prevented from operating at a temperature that exceeds a predetermined temperature, for example, a maximum operating temperature of that compressor.

BRIEF DESCRIPTION OF THE DRAWINGS

A more complete appreciation of the invention and many of the attendant advantages thereof will become readily apparent with reference to the following detailed description, particularly when considered in conjunction with the accompanying drawing, in which.

DETAILED DESCRIPTION OF THE INVENTION

Embodiments of the present invention are described hereinafter with reference to the accompanying drawing. In the following description, the constituent elements having substantially the same function and arrangement are denoted by the same reference numerals, and repetitive descriptions will be made only when necessary.

Compressor systems using more than one stage of gas compression typically use balanced pressure ratios throughout the compression system in order to ensure that a discharge temperature from each stage of compression is the same as all of the other stages. The discharge temperature is set to be consistent with a maximum allowable temperature for the materials of construction of the compressor, such as sealing rings and valve components. The maximum allowable temperature for the materials of construction of a compressor are in some cases as high as 350° F., but for hydrogen-containing gases is typically limited to 275° F. by industry best practices.

The inventors of the present invention have determined that in compression systems for gases containing significant contamination due to heavy hydrocarbons, especially polycyclic aromatic hydrocarbons (PAH's,) that the above temperature limits are too high to prevent chemical degradation of the contaminants, even when the contaminates are dissolved in lubricating oil, such as in U.S. application Ser. No. 11/749,521. The inventors have determined that the extent of fouling at comparable temperatures decreases with each stage of compression, as a greater proportion of the contaminants are removed using the method and apparatus set forth in U.S. application Ser. No. 11/749,521.

Thus, the present invention advantageously provides an improved multistage gas compressor system that resists disabling fouling of one or more of the compressor stages therein, which not only hinders operation of the compressor stage(s), but can also render the compressor stage(s) inoperative, thereby requiring stoppage of the system for maintenance and cleaning of the compressor stage(s). The present invention is especially useful for providing an improved recycling apparatus for spent protective atmosphere gas contaminated with fouling organic decomposition byproduct materials.

In a first aspect of the invention, a multistage gas compressor system includes a first stage compressor configured such that a first discharge temperature of the first stage is set below a temperature at which contaminates dissolved within a lubricant in the first stage compressor are chemically degraded, in order to prevent disabling fouling of the components of the first stage compressor. Additionally, the multistage gas compressor system can also include a second stage compressor configured such that a second discharge temperature of the second stage is set below a temperature at which contaminates dissolved within a lubricant in the second stage compressor are chemically degraded, in order to prevent disabling fouling of the components of the second stage compressor. The gas compressor system of the invention can also optionally use one or more additional stages, where each additional stage has a discharge temperature that is set below a temperature at which contaminates are chemically degraded in order to prevent disabling fouling of the components thereof. The discharge temperatures of the stages can be above or below the preceding stages. Also, the present invention contemplates embodiments in which a second or subsequent stage has a discharge temperature that exceeds the temperature at which the contaminates are chemically degraded, since in these stages many of the contaminates may have already been removed from the lubricant in the preceding stage(s), and thus these later stage(s) would not be subject to as much fouling. Therefore, the discharge temperatures of these later stages can be set to be greater than in the preceding stage(s), but not exceeding the maximum allowable temperature limits set by the compressor materials of construction or industry best practice. The present invention also contemplates embodiments in which the discharge temperatures in the succession of stages increases and/or decreases from stage to stage, for example, an embodiment in which the discharge temperature of the second stage is colder than the first stage and warmer than the third stage.

Thus, the first aspect of the present invention can include a multistage gas compressor system that includes a first stage of compression that compresses to a first compression ratio and a first discharge temperature, while being lubricated and dissolving or absorbing contaminants within the lubricant, and a second stage of compression that compresses to a second pressure ratio and second discharge temperature, while being lubricated and dissolving contaminates within the lubricant. In one embodiment, the second pressure ratio and second discharge temperature are equal to or higher than the first pressure ratio and first discharge temperature in the first stage. The gas compressor system of the invention can optionally use one or more additional stages, where each addition stage has a compression ratio and discharge temperature that is controlled as desired, for example, a discharge temperature that is below a temperature at which the contaminates are chemically degraded, or a discharge temperature that is greater than in the second stage, but not exceeding the maximum allowable temperature limits set by the compressor materials of construction or industry best practice.

The present invention preferably provides a first stage of compression that provides a first discharge temperature that is set below a temperature at which contaminants being dissolved or absorbed within a lubricant are chemically degraded, in order to prevent fouling of the components of the first stage compressor. For example, the first stage of compression can be provided with a first discharge temperature that is less than or equal to 250° F., less than or equal to 225° F., or less than or equal to 200° F. The discharge temperature of the stages can be controlled/calculated using the pressure and temperature ratios upstream and downstream of the compressor at that stage using the equation:

$$T_2/T_1 = (P_2/P_1)^{(k-1)/k} \quad \text{(Eq. 1)},$$

where $T_1$ is the temperature upstream of the compressor, $P_1$ is the pressure upstream of the compressor, $T_2$ temperature downstream of the compressor, $P_2$ is the pressure downstream of the compressor, and k is the ratio of specific heats, which is approximately 1.4 for most gases.

Thus, by controlling the discharge temperature of at least the first stage compressor, which is the most susceptible to fouling, and preferably one or more additional compressor stages, the present invention advantageously provides an improved multistage gas compressor system that resists disabling fouling of one or more of the compressor stages therein, which can not only hinder operation of the compressor stage(s), but also render the compressor stage(s) inoperative, and requiring stoppage of the system for maintenance and cleaning of the compressor stage(s).

A second aspect of the present invention is further advantageously provided, in which an improved multistage gas compressor system that resists disabling fouling of one or more of the compressor stages therein is provided. In the second aspect, the improved multistage gas compressor system includes a first compressor stage that resists disabling fouling by using a type of compressor in the first stage that is not susceptible to being disabled by fouling. Thus, in this aspect, the various stages can be operated using balanced pressure ratios, by providing one or more of the upstream compressor stages, which are subject to high levels of fouling, with compressor(s) that are not susceptible to being disabled by fouling, and one or more downstream compressor stages, which are subject to lower levels of fouling, with compressor(s) that are more susceptible to being disabled by fouling.

Thus, the second aspect includes one or more upstream compressor stages having compressor(s) that are not susceptible to being disabled by fouling. For example, compressors that do not have valves, such as a rotary lobe blower or a screw or Lysgholm compressor, are less susceptible to disabling by fouling than compressors that do have valves, such as reciprocating piston compressors. Subsequent compressor stages, which are subject to lower levels of fouling, can be provided with compressor(s) that do have valves, which are more susceptible to being disabled by fouling.

Thus, the first aspect controls the discharge temperatures of the compressor stages in order to prevent a discharge temperature at which contaminants dissolved within the lubricant are chemically degraded, in order to prevent fouling of the components of the compressor. Such a configuration is contrary to conventional wisdom, since it necessarily achieves less compression per unit of compression equipment installed than is theoretically possible. However, as the inventors have discovered, such a configuration can advantageously reduce fouling of the components in the early stage(s) of the system, and thus resist hindering of the operation of the compressor stage(s) by such fouling, and reduce the need for stoppage of the system for maintenance and cleaning of the compressor stage(s).

Furthermore, the second aspect allows for the operation of the system using balanced compression ratios, but advantageously provides a more robust system that resists disabling fouling by utilizing in one or more of the upstream compressor stages, which are subject to high levels of fouling, compressor(s) that are not susceptible to being disabled by fouling. Such a configuration advantageously reduces disabling of the components in the early stage(s) of the system by fouling, and thus resists hindering of the operation of the compressor stage(s) by such fouling, and reduces the need for stoppage of the system for maintenance and cleaning of the compressor stage(s).

In addition, the first and second aspects of the present invention can be used in combination with one another to take achieve the advantages of both aspects. Thus, one or more upstream compressor stages having compressor(s) that are not susceptible to being disabled by fouling according to the second aspect of the invention can be used in combination with the progressively-increasing pressure ratio approach of the first aspect of the invention.

Figure 1:
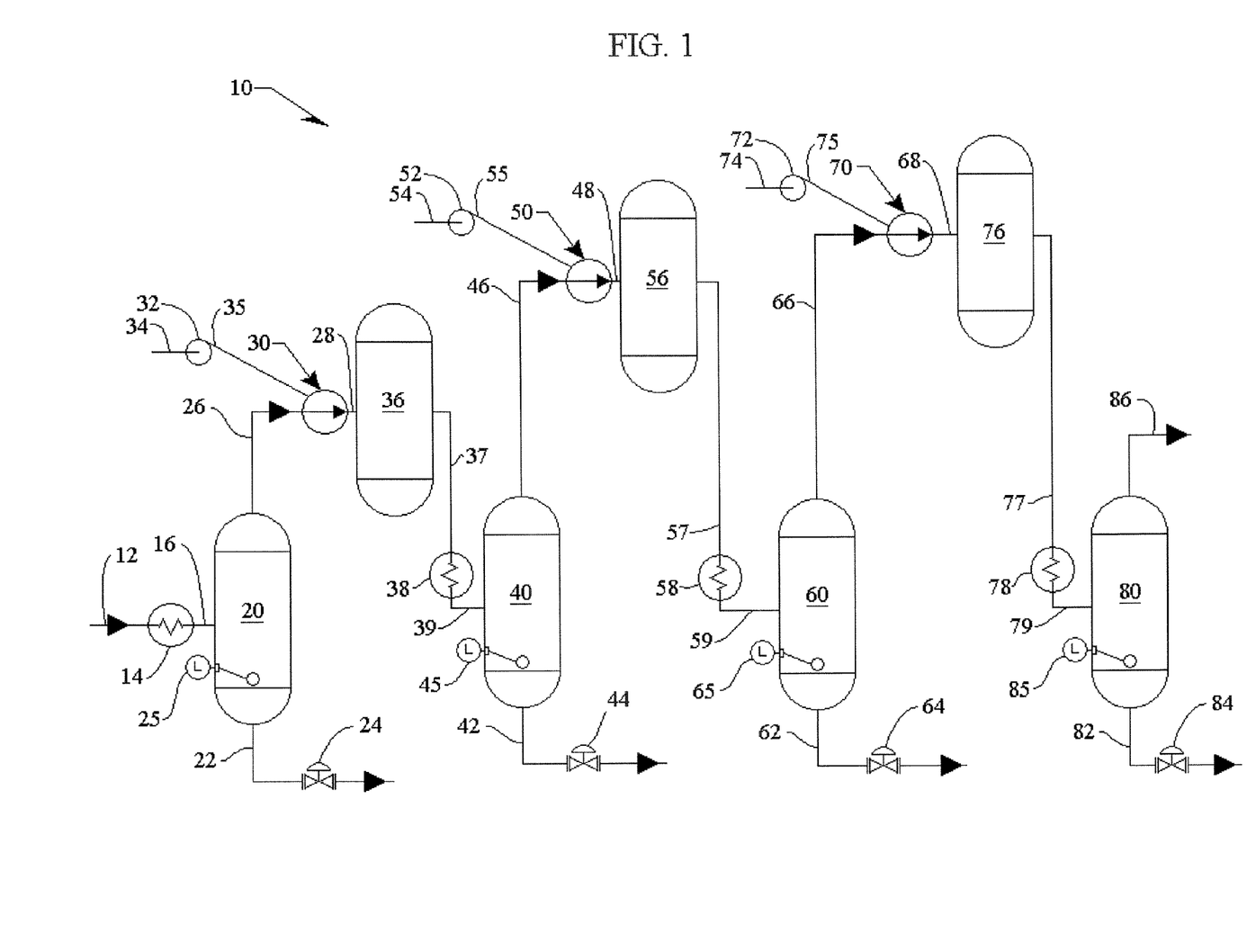
FIG. 1 depicts a schematic view of a multistage compression system according to the present invention with compressor lubrication.

The FIG. 1 depicts a schematic view of a multistage compression system 10 that inducts a gas stream via a conduit 12. A heat exchanger or cooler 14 can be provided if desired in order to cool the gas stream to a desired suction temperature. The cooled gas then passes along a conduit 16 to a pulsation buffering dampener or chamber 20 that minimizes fluctuations in pressure caused by suction of a first stage compressor 30 downstream thereof. The chamber 20 is connected to an inlet of the first stage compressor 30 by a conduit 26. An outlet of the first stage compressor 30 is connected via a conduit 28 to an optional pulsation dampener 36 that is connected via a conduit 37 to a heat exchanger or cooler 38, which may be connected via a conduit 39 to a pulsation buffering dampener or chamber 40. The gas then exits the chamber 40 and, in the embodiment depicted in the FIG. 1 travels through at least two more successive paths in a similar manner to that described above.

Pulsation dampener(s), such as pulsation dampener 36 discussed above and pulsation dampeners 56 and 76 discussed below, can be provided upstream of the heat exchangers 38, 58 and 78 to mitigate pulsations from the compressors 30, 50, 70. Such pulsation dampeners can be independent vessels as specified, for instance, in American Petroleum Institute standard 618. In other embodiments, the pulsation dampeners can be of the type that integrate the heat exchange function with the upstream and downstream pulsation dampener as in U.S. application Ser. No. 11/749,521.

The gas exiting the chamber 40 travels via a conduit 46 to a second stage compressor 50 downstream thereof. The chamber 40 is connected to an inlet of the second stage compressor 50 by the conduit 46, and an outlet of the second stage compressor 50 is connected via a conduit 48 to the optional pulsation dampener 56 that is connected via a conduit 57 to a heat exchanger or cooler 58, which is connected via a conduit 59 to a pulsation buffering dampener or chamber 60. The gas then exits the chamber 60 and, in the embodiment depicted in the FIG. 1 travels through at least one more successive path.

Thus, the gas exiting the chamber 60 travels via a conduit 66 to a third stage compressor 70 downstream thereof. The chamber 60 is connected to an inlet of the third stage compressor 70 by the conduit 66, and an outlet of the third stage compressor 70 is connected via a conduit 68 to the optional pulsation dampener 76 that is connected via a conduit 77 to a heat exchanger or cooler 78, which is connected via a conduit 79 to a pulsation buffering dampener or chamber 80. The gas then exits the chamber 80 via a conduit 86 for use, further compression, and/or further processing.

Each of the chambers 20, 40, 60, and 80 can serve as a liquid and/or solid particle separation vessel, for example, by being provided with internal baffles, filter elements, packed-media, a cyclone section, or other means to effect droplet separation. In order to evacuate separated material from the chambers 20, 40, 60, and 80, these chambers are provided with drains 22, 42, 62, and 82, respectively, and drain valves 24, 44, 64, and 84, respectively. The drain valves can be manual valves or automated valves. The drain vales can also be actuated by level sensors 25, 45, 65, and 85, respectively, which can be of any level sensor type, such as radar, capacitance, thermal conductivity, ultrasonic, mechanical float, or optical, as suits the material being collected. In lieu of the level sensors, the drain valves 24, 44, 64, and 84 can be automated based on timers, on number of compressor rotations, or on other means. The method of automation does not limit the present invention in any way.

In the embodiment depicted in the FIG. 1, each of the compressors 30, 50, and 70 are provided with at least one supply of solvent, which in this case is a lubricant, via a supply conduit 34, 54, and 74, respectively, a pump 32, 52, and 72, respectively, and a conduit 35, 55, and 75, respectively. Because a liquid mixture can collect in the vessels 20, 40, 60, and 80, because of the solvent supply and/or because of condensation from the coolers 14, 38, 58, and 78, these vessels are provided with drains 22, 42, 62, and 82, respectively, and drain valves 24, 44, 64, and 84, respectively. The addition of lubricant advantageously serves to enhance the sealing and wear life of the compressors 30, 50, and 70.

The chemical composition and addition rate of the lubricant can advantageously be selected in order to segregate the contaminants in the gas feedstock stream (from conduit 12) into a liquid mixture of the solvent and any contaminants entrapped or dissolved in the solvent, which can be collected in chambers 20, 40, 60, and 80 and discharged via the drains 22, 42, 62, and 82, respectively, and drain valves 24, 44, 64, and 84, respectively. The lubricant can be the same lubricant used to lubricate the compressors. Because dissolved hydrocarbon, water and solid contaminants could alter the properties of the lubricant, it is preferred that a lubricant supply is employed that is separate from the lubricant supply for the mechanical components of the compressor.

Solvent can also be injected into the gas stream at various other locations, for example, in conduit 12, in cooler 14, in conduit 16, in chamber 20, in conduit 26, in conduit 28, in conduit 37, in cooler 38, in conduit 39, in chamber 40, in conduit 46, in conduit 48, in conduit 57, in cooler 58, in conduit 59, in chamber 60, in conduit 66, in conduit 68, in conduit 77, in cooler 78, in conduit 79, in chamber 80, or in conduit 86. The liquid mixture of the solvent and any contaminants entrapped or dissolved in the solvent then can be collected in chambers 20, 40, 60, and 80 and discharged via the drains 22, 42, 62, and 82, respectively, and drain valves 24, 44, 64, and 84, respectively.

Thus, according to the first aspect of the present invention, the compressors 30, 50, and 70 are configured to control the discharge temperatures of each of these compressor stages in order to prevent a discharge temperature at which contaminants dissolved within the lubricant are chemically degraded, in order to prevent fouling of the components of the compressor. Accordingly, the first stage compressor 30 is configured such that a first discharge temperature of the first stage is set below a temperature at which contaminants dissolved within the solvent the first stage compressor 30 are chemically degraded, in order to prevent disabling fouling of the components of the first stage compressor 30. Additionally, the subsequent stages can be configured in the same manner.

The gas compressor system of the invention can also provide each successive stage with a desired discharge temperature that is either below the temperature at which the contaminates are chemically degraded or greater than such a temperature, but not exceeding the maximum allowable temperature limits set by the compressor materials of construction or industry best practice. Thus, by controlling the discharge temperature of at least the first stage compressor 30, which is the most susceptible to fouling, and preferably one or more additional compressor stages, such as compressors 50 and 70, the present invention advantageously provides an improved multistage gas compressor system that resists disabling fouling of one or more of the compressor stages therein, which can not only hinder operation of the compressor stage(s), but also render the compressor stage(s) inoperative, and requiring stoppage of the system for maintenance and cleaning of the compressor stage(s).

As noted above, the discharge temperature of each compressor stage can be controlled/calculated using the pressure and temperature ratios upstream and downstream of the compressor at that stage. Thus, by selecting a compressor configured to provide the appropriate pressure ratio, and determining the gas temperature upstream of the compressor, and appropriate discharge temperature can be provided.

Furthermore, according to the second aspect of the invention, the system depicted in the FIG. 1 can be operated using balanced compression ratios for the compressors 30, 50, and 70, by configuring one or more upstream compressor stages to use compressor(s) that are not susceptible to being disabled by fouling (e.g. compressors that do not have valves, such as a rotary lobe blower or a screw compressor). Subsequent compressor stages, which are subject to lower levels of fouling, can be provided with compressor(s) that do have valves, which are more susceptible to being disabled by fouling. Thus, in the embodiment depicted in the FIG. 1, the first stage compressor (and even the second stage compressor 50, if fouling is anticipated or prone to occur at the second stage compressor) can be a compressor that is not susceptible to being disabled by fouling, such as a compressor that does not have valves, such as a rotary lobe blower or a screw compressor. Subsequent stages, which are not subject to as much risk of fouling (since in subsequent stages a large amount of the contaminates have been removed from the gas stream by previous stage(s)), such as the second stage and/or the third stage, etc., can be provided with compressors that are more susceptible to being disabled by fouling, such as a compressor that have valves etc. Thus, a more robust system is provided that resists disabling fouling by utilizing in one or more of the upstream compressor stages, which are subject to high levels of fouling, compressor(s) that are not susceptible to being disabled by fouling. Such a configuration advantageously reduces disabling of the components in the early stage(s) of the system by fouling, and thus resists hindering of the operation of the compressor stage(s) by such fouling, and reduces the need for stoppage of the system for maintenance and cleaning of the compressor stage(s).

A third aspect of the present invention is a high compressor temperature prevention algorithm. This third aspect of the invention provides for a method of controlling one or more stages of a multi-stage compressor system such that one or more of the compressors within the multi-stage compressor system are prevented from operating at a temperature that exceeds a predetermined temperature, for example, a maximum operating temperature of that compressor, or a temperature at which contaminants dissolved within the lubricant are chemically degraded, etc.

In an embodiment of the third aspect of the invention, a compressor is used that has a maximum temperature that is a function of flow, such as an air-cooled compressor or a liquid-cooled compressor with insufficient cooling capacity. The operating temperature of the compressor is measured, and when the measured operating temperature exceeds a predetermined threshold temperature value, which in this embodiment is the maximum operating temperature of the compressor or the threshold temperature for degradation or the impurities present in the gas, then an operating speed of the compressor is controlled such that the speed is decreased to a speed at which the compressor temperature will be at or below the threshold temperature. If the measured operating temperature continues to increase, then the speed of the compressor will be further decreased to achieve a compressor temperature that is at or below the threshold temperature. One consequence of this control operation is that the operating speed of the compressor will not be able to be increased to displace inlet flow to control the inlet pressure to a desired setpoint pressure, without then risking an increase in compressor operating temperature that exceeds the threshold temperature. However, this consequence can be mitigated by providing a backpressure regulator at a suction side of the compressor that is set to vent a portion of the feed gas, thus preventing an undesirable increase in the feed pressure.

Figure 2:
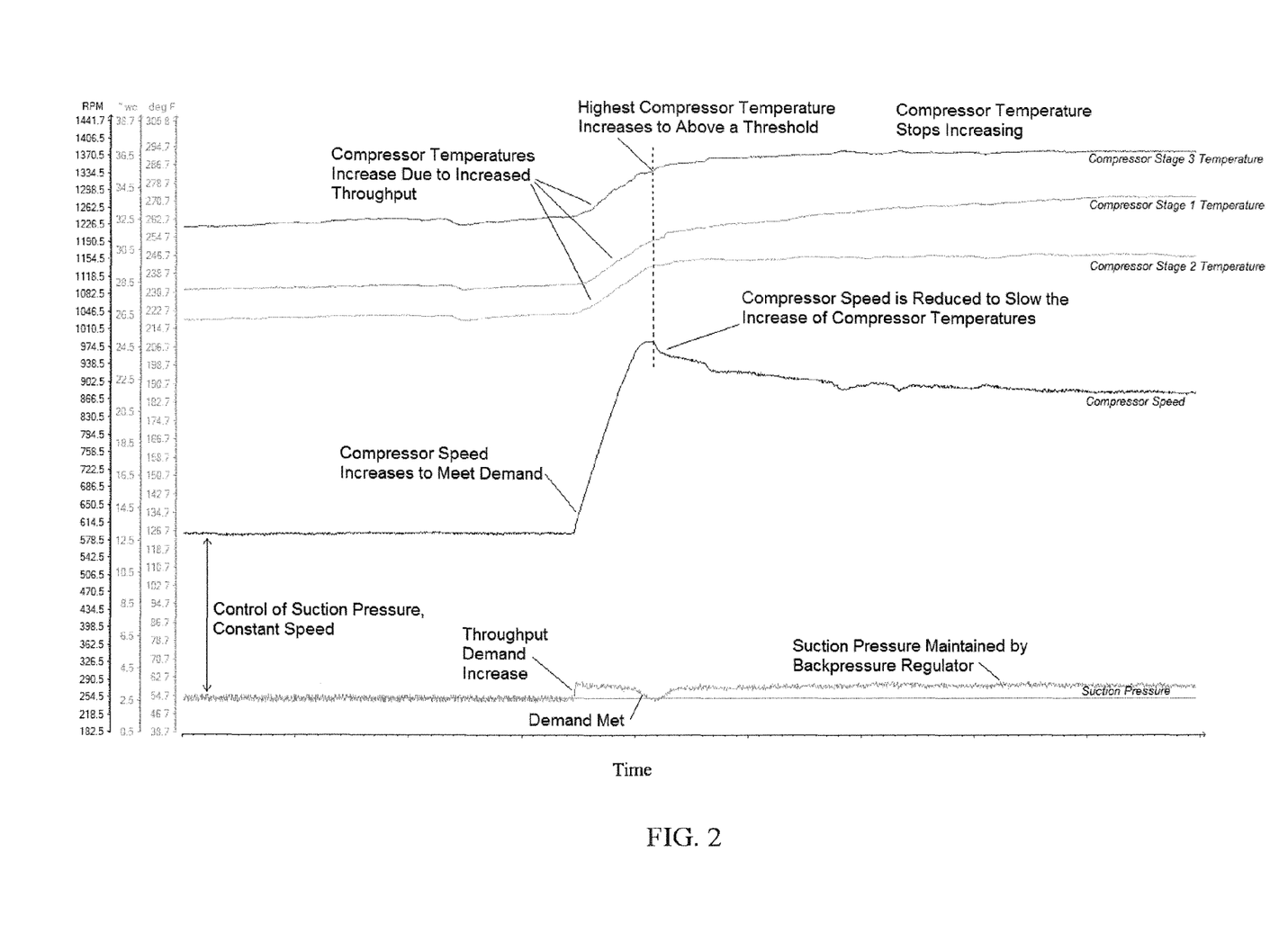
FIG. 2 is a graph showing compressor temperature, compressor operating speed, and suction pressure curves over time for a multi-stage compressor system being operated using a high compressor temperature prevention algorithm according to a third aspect of the present invention.
Figure 3:
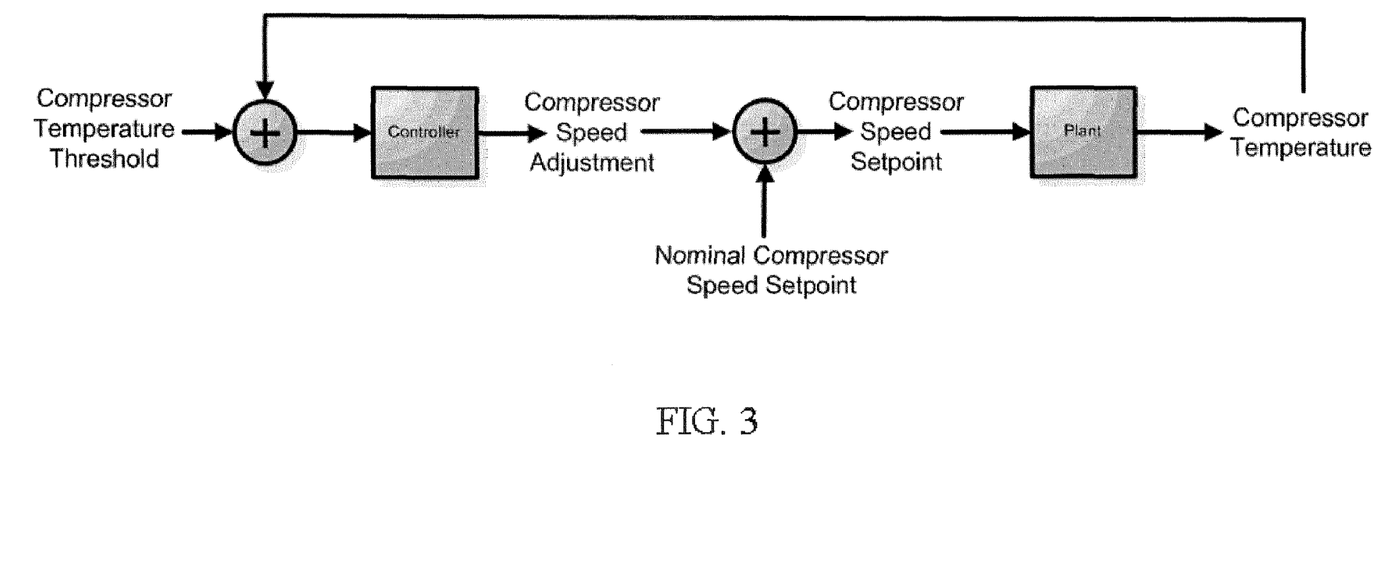
FIG. 3 depicts a high compressor temperature prevention algorithm according to the third aspect of the present invention.

Under normal compressor operation, the compressor speed is set to control the suction pressure, as can be seen in the compressor speed graph on the left hand side of FIG. 2. If more flow is introduced to the suction side of the compressor, then the compressor speed is increased to accommodate and meet that flow requirement, as can be seen in the middle portion of the graph in FIG. 2. However, along with the increase in flow and compressor speed, the compressor temperatures increase, as can be seen in the compressor temperature graphs in FIG. 2, and the suction pressure returns to a setpoint, as can be seen in the suction pressure graph in FIG. 2. If at any time, with increased flow or otherwise, the compressor temperature exceeds a threshold temperature, then the algorithm of the present invention (as depicted in FIG. 3) will decrease the compressor speed as much as necessary to cause the compressor temperature increase to stop and the compressor operating temperature to substantially level out. The suction pressure is then limited by a back pressure regulator. This method can be advantageously used in combination with the compressor speed control algorithm disclosed in U.S. application Ser. No. 11/749,521.

The controller of the third aspect of the present invention is depicted in FIG. 3. The controller determines a modification to be added to a nominal speed setpoint to create a compressor speed setpoint which is delivered to the plant, which can include but is not limited to the compressor motor controller, compressor motor, compressor body, gas being processed, piping, and measurement instruments. The compressor temperature is used in conjunction with a threshold temperature to provide information to the controller that the controller uses to determine the modification that is to be added to the nominal speed setpoint.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A multistage gas compressor system, said system comprising:
    a plurality of compressor stages connected in series along a gas passage configured to receive a gas flow having contaminants, said plurality of compressor stages including a first compressor in a first compressor stage and a second compressor in a second compressor stage disposed downstream from said first compressor stage along said gas passage;
    a solvent supply configured to supply solvent to said gas passage at or upstream of said first compressor to entrap or dissolve the contaminants in the gas flow;
    a controller to determine a first upstream gas pressure, a first upstream gas temperature, and a first specific heat for the gas flow upstream of said first compressor;
    said first compressor is configured to produce a pressure ratio that provides a first discharge temperature that remains below a threshold temperature at which the contaminants entrapped or dissolved within the solvent are chemically degraded based on the upstream gas pressure, the upstream gas temperature, and the specific heat determined by the controller for the gas flow upstream of said first compressor;
    said second compressor is configured to produce a pressure ratio that provides a second discharge temperature that remains below a threshold temperature at which the contaminants entrapped or dissolved within the solvent are chemically degraded based on a second upstream gas pressure, a second upstream gas temperature, and a second specific heat for the gas flow downstream said first compressor and upstream said second compressor; and
    the second discharge temperature is higher than the first discharge temperature.

2. The system according to claim 1, wherein said first compressor does not have any valves, and wherein said second compressor does not have any valves.

3. The system according to claim 1, wherein said first compressor does not have any valves, and wherein said second compressor does have one or more valves.

4. The system according to claim 1, further comprising:
    a chamber connected to said gas passage downstream of said first compressor or said second compressor; and
    a heat exchanger provided along said gas passage in between said first compressor or said second compressor and said chamber.

5. The system according to claim 1, wherein said controller is further configured to vary a speed of operation of said first compressor or said second compressor to maintain the discharge temperature of said first compressor or said second compressor below the threshold temperature.

6. The system according the claim 5, further comprising a backpressure regulator provided at a suction side of said first compressor or said second compressor.

7. A multistage stage gas compressor system, said system comprising:
    a plurality of compressor stages connected in series along a gas passage configured to receive a gas flow having contaminants;
    a solvent supply configured to supply solvent to said gas passage at or upstream of a compressor in a compressor stage of said plurality of compressor stages to entrap or dissolve the contaminants in the gas flow; and
    a controller configured to vary a speed of operation of said compressor to maintain an operating temperature of said compressor below a predetermined threshold temperature based on an upstream gas pressure, an upstream gas temperature, and a specific heat of the gas flow upstream of said compressor;
    wherein
        said compressor does not have any valves,
        said compressor includes
            a first compressor in a first compressor stage, and
            a second compressor in a second compressor stage of said plurality of compressor stages is provided downstream from said first compressor stage along said gas passage, and
        an operating temperature of the second compressor is higher than the operating temperature of the first compressor.

8. The system according to claim 7, wherein said first compressor does not have any valves, and wherein said second compressor does not have any valves.

9. The system according to claim 7, wherein said first compressor does not have any valves, and wherein said second compressor does have one or more valves.

10. The system according to claim 7, wherein said first compressor is a rotary lobe blower compressor, a screw compressor, or a Lyscholm compressor.

11. The system according to claim 7, wherein said second compressor is a reciprocating piston compressor.

12. The system according to claim 7, further comprising:
    a chamber connected to said gas passage downstream of said compressor; and
    a heat exchanger provided along said gas passage in between said compressor and said chamber.

13. The system according to claim 7, further comprising a backpressure regulator provided at a suction side of said compressor.

14. A method of operating a multistage gas compressor system, said method comprising:
    providing a plurality of compressor stages connected in series;
    receiving a gas flow having contaminants within a gas passage;
    supplying solvent to the gas passage at or upstream of a first compressor in a first compressor stage of the plurality of compressor stages to entrap or dissolve the contaminants in the gas flow;
    determining a first upstream gas pressure, a first upstream gas temperature, and a first specific heat for the gas flow upstream of the first compressor;
    controlling a first discharge temperature of the first compressor to maintain the discharge temperature below a threshold temperature at which the contaminants entrapped or dissolved within the solvent are chemically degraded based on the upstream gas pressure, the first upstream gas temperature, and the first specific heat determined in the determining for the gas flow upstream of said first compressor to resist disabling fouling of the compressor in the compressor stage from the contaminants entrapped or dissolved in the solvent; and
    controlling a second discharge temperature of a second compressor to resist disabling fouling of the second compressor in a second compressor stage from the contaminants entrapped or dissolved in the solvent, the second compressor stage being downstream from the first compressor stage along the gas passage;
    wherein the second discharge temperature is higher than the first discharge temperature.

15. The method according to claim 14, further comprising:
providing a chamber connected to the gas passage downstream of the first compressor or the second compressor;
collecting in the chamber a mixture including the solvent and any contaminants entrapped or dissolved in the solvent;
providing a heat exchanger along the gas passage in between the first compressor or the second compressor and the chamber; and
cooling the gas flow using the heat exchanger.

16. The method according to claim 14, further comprising:
supplying solvent to the gas passage downstream of the first compressor and at or upstream of the second compressor to entrap or dissolve the contaminants in the gas flow.

17. The method according to claim 14, wherein the solvent is lubricant used to lubricate the compressor.

18. The method according to claim 14, wherein the compressor is a type of compressor that is not susceptible to being disabled by fouling.

19. The method according to claim 18, wherein the type of compressor used as the compressor does not have any valves.

20. The method according to claim 18, wherein the type of compressor used as the compressor is a rotary lobe blower compressor, a screw compressor, or a Lyscholm compressor.

21. The method according to claim 14, wherein the first compressor is a type of compressor that is not susceptible to being disabled by fouling.

22. The method according to claim 21, wherein the second compressor is a type of compressor that is not susceptible to being disabled by fouling.

23. The method according to claim 21, wherein the second compressor is a type of compressor that does have one or more valves.

24. The method according to claim 14, further comprising:
regulating a backpressure at a suction side of the compressor.

* * * * *